US012295302B2

(12) United States Patent
Rhodes et al.

(10) Patent No.: US 12,295,302 B2
(45) Date of Patent: May 13, 2025

(54) HORTICULTURAL LIGHT

(71) Applicant: ABL IP HOLDING LLC, Atlanta, GA (US)

(72) Inventors: Bruce Rhodes, Inverness, IL (US); Paul Kolenda, Batavia, IL (US); Bogdan Gheorge, Oak Park, IL (US); Dudet Useinovski, West Chicago, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/449,985

(22) Filed: Aug. 15, 2023

(65) Prior Publication Data

US 2024/0196809 A1  Jun. 20, 2024

Related U.S. Application Data

(63) Continuation of application No. 15/645,565, filed on Jul. 10, 2017, now abandoned.

(60) Provisional application No. 62/360,077, filed on Jul. 8, 2016.

(51) Int. Cl.
*A01G 7/04* (2006.01)
*H05B 45/20* (2020.01)
*H05B 45/54* (2020.01)
*H05B 47/19* (2020.01)

(52) U.S. Cl.
CPC ............ *A01G 7/045* (2013.01); *H05B 45/20* (2020.01); *H05B 45/54* (2020.01); *H05B 47/19* (2020.01); *Y02A 40/25* (2018.01); *Y02P 60/14* (2015.11)

(58) Field of Classification Search
CPC ........ A01G 7/045; H05B 45/20; H05B 45/54; H05B 47/19; Y02A 40/25; Y02P 60/14
See application file for complete search history.

(56) References Cited

U.S. PATENT DOCUMENTS

| | | | |
|---|---|---|---|
| 7,573,729 B2 | 8/2009 | Elferich et al. | |
| 8,723,766 B2 | 5/2014 | Shteynberg | |
| 8,933,638 B2 | 1/2015 | Maxik et al. | |
| 8,975,825 B2 | 3/2015 | Yu | |
| 9,131,578 B2 | 9/2015 | Yao et al. | |
| 9,137,874 B2 | 9/2015 | Maxik et al. | |
| 9,179,527 B2 | 11/2015 | Yao et al. | |

(Continued)

FOREIGN PATENT DOCUMENTS

KR    20110022410 A    3/2011

OTHER PUBLICATIONS

Information Disclosure Form dated Jul. 11, 2017 which was filed in connection with U.S. Appl. No. 15/645,565.

(Continued)

*Primary Examiner* — Anne M Hines
*Assistant Examiner* — Jose M Diaz
(74) *Attorney, Agent, or Firm* — Kilpatrick Townsend & Stockton LLP

(57) ABSTRACT

A horticultural lighting system and method for controlling same. Lights operating at different peak wavelengths, which affect the color of lights, can be optimized for different plant species during different stages of growth. The present disclosure pertains to a horticultural light, a system of horticultural lights, and a method for controlling light output to optimize different types of plants in various stages of plant growth cycles.

28 Claims, 14 Drawing Sheets

(56) References Cited

U.S. PATENT DOCUMENTS

| | | |
|---|---|---|
| 9,189,996 B2 | 11/2015 | Casper et al. |
| 2002/0145394 A1 | 10/2002 | Morgan et al. |
| 2002/0195975 A1 | 12/2002 | Schanberger et al. |
| 2003/0028260 A1 | 2/2003 | Blackwell |
| 2004/0052076 A1* | 3/2004 | Mueller .............. F21V 23/0442 362/293 |
| 2004/0109302 A1 | 6/2004 | Yoneda |
| 2007/0253196 A1 | 11/2007 | Ormiston |
| 2008/0122376 A1 | 5/2008 | Lys |
| 2011/0018465 A1 | 1/2011 | Ashdown |
| 2011/0209400 A1 | 9/2011 | Rooymans |
| 2012/0170264 A1 | 7/2012 | Mckenzie et al. |
| 2013/0229123 A1 | 9/2013 | Chen et al. |
| 2014/0152194 A1 | 6/2014 | Beyer |
| 2015/0289328 A1 | 10/2015 | Conrad et al. |
| 2016/0064204 A1 | 3/2016 | Greenberg et al. |
| 2016/0095194 A1 | 3/2016 | Yoneoka et al. |
| 2016/0120010 A1 | 4/2016 | Reed |
| 2016/0262313 A1 | 9/2016 | Szeto et al. |
| 2017/0241632 A1 | 8/2017 | Nguyen et al. |

OTHER PUBLICATIONS

892 Form dated Feb. 10, 2020 which was received in connection with U.S. Appl. No. 15/645,565.
892 Form dated Apr. 21, 2021 which was received in connection with U.S. Appl. No. 15/645,565.
892 Form dated Aug. 25, 2021 which was received in connection with U.S. Appl. No. 15/645,565.
892 Form dated May 23, 2022 which was received in connection with U.S. Appl. No. 15/645,565.
892 Form dated Oct. 5, 2022 which was received in connection with U.S. Appl. No. 15/645,565.

* cited by examiner

LED Specifications

| LED Type | LED Peak Wavelength | Number of LED's | LED Current (mA) | LED Voltage (VDC) | LED String Voltage (VDC) | LED Electrical Power (watts) |
|---|---|---|---|---|---|---|
| SSL 80 | IR LED (730 nm) | 6 | 800 | 2.11 | 12.7 | 10.1 |
| SSL 80 | Red LED (660 nm) | 14 | 800 | 2.43 | 34.0 | 27.2 |
| SSL 80 | Red LED (634 nm) | 12 | 800 | 2.55 | 30.5 | 24.4 |
| SSL 80 | Blue LED (465 nm) | 18 | 700 | 3.8 | 49.8 | 25.2 |
| | UV LED (385 nm) | 14 | 500 | 3.2-4.2 | 42 | 25.2 |
| SSL 80 | 5000K White LED | 6 | 500 | 3.03 | 18.2 | 9.2 |

FIG. 3

HORTICULTURAL LIGHT

RELATED APPLICATION

This application is a continuation of and claims benefit of and priority to U.S. patent application Ser. No. 15/645,565 filed on Jul. 10, 2017, which claims benefit of and priority to U.S. Provisional Patent Application Ser. No. 62/360,077, filed Jul. 8, 2016, the contents of each of which are hereby incorporated by reference in their entirety.

BACKGROUND

Plants are often grown in an enclosed environment so that growers can better control ambient factors that affect plant growth (e.g., temperature, sunlight, and moisture). Cultivating plants in an enclosed environment requires an artificial light source to replace sunlight.

SUMMARY

Lights operating at different peak wavelengths, which affect the color of lights, can be optimized for different plant species during different stages of growth. The present disclosure pertains to a horticultural light, a system of horticultural lights, and a method for controlling light output to optimize different types of plants in various stages of plant growth cycles.

Other aspects will become apparent by consideration of the detailed description and accompanying drawings.

BRIEF DESCRIPTION OF THE DRAWINGS

FIG. 3 is a table of LED specifications for a horticultural light according to one embodiment.

Figure 1:
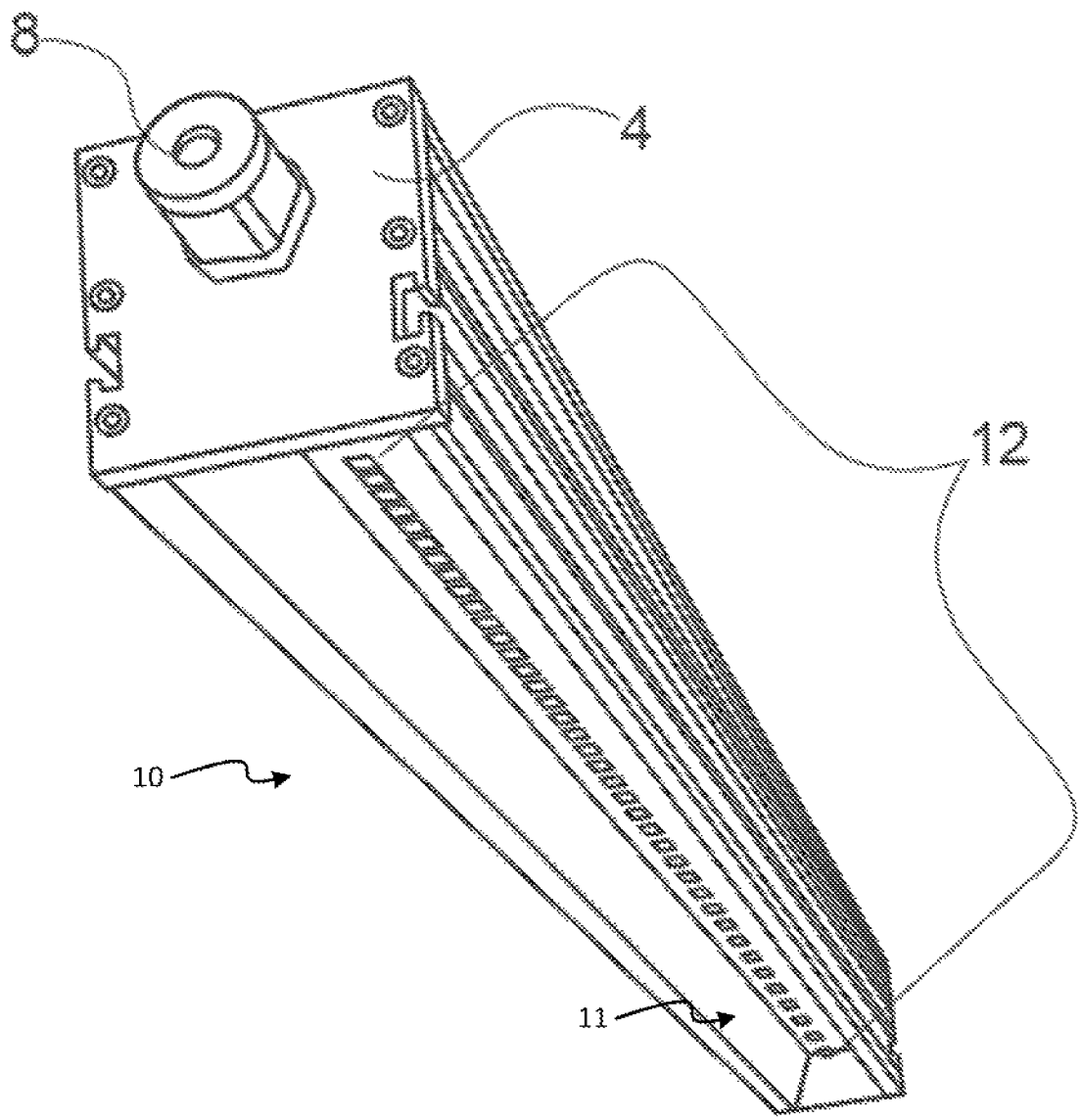
FIG. 1 is a perspective view of a horticultural light.

Skilled artisans will appreciate that elements in the figures are illustrated for simplicity and clarity and have not necessarily been drawn to scale. Illustrations may show only those specific details that are pertinent to understanding the embodiments presented so as not to obscure the disclosure with details that will be readily apparent to those of ordinary skill in the art in light of the description herein.

DETAILED DESCRIPTION

Embodiments presented herein relate to an array of different colored light emitting diodes (LEDs) operating at various peak wavelengths in a horticultural light. A user may control the light intensity of each LED color group in the horticultural light to produce an appropriate light mix output that optimizes different stages of plant growth.

One example embodiment provides a horticultural lighting fixture. The lighting fixture includes a housing fixture having an outer surface including an opening. The lighting fixture includes an array of different colored light emitting diodes (LEDs) operating at various peak wavelengths. The lighting fixture includes a current control channel in electrical communication with at least one of the LEDs. The lighting fixture includes a fixture control for controlling light wave intensity of each LED via the current control channel. The lighting fixture includes a fixture firmware to store programmable user input. The lighting fixture includes a fixture ID to identify the housing fixture in a system of horticultural lights.

Another example embodiment provides a system of horticultural lights. The system includes a plurality of horticultural lights, each consisting a housing fixture and an array of different colored light emitting diodes (LEDs). The system includes a plurality of current control channels in electrical communication with at least one of the LEDs. The system includes a plurality of fixture controls for controlling light wave intensity of each LED via the current control channel. The system includes a fixture mesh network including at least one fixture control. The system includes an at least one master fixture control for receiving information from a user and relaying the information to other fixture control(s) in the fixture mesh network. The system includes a plurality of fixture firmware consisting one or more zone control variable, the one or more user input recipe, and multiple preset modes of operation.

Another example embodiment provides a method for programming a horticultural light. The method includes receiving a user input including intensity level for at least one LED color group. The method includes transmitting the user input to a fixture control. The method includes relaying information between a network of at least one fixture controls. The method includes, based on the relayed information, controlling a wavelength intensity of a light emitting diode (LED) to produce a desirable colored light.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 2:
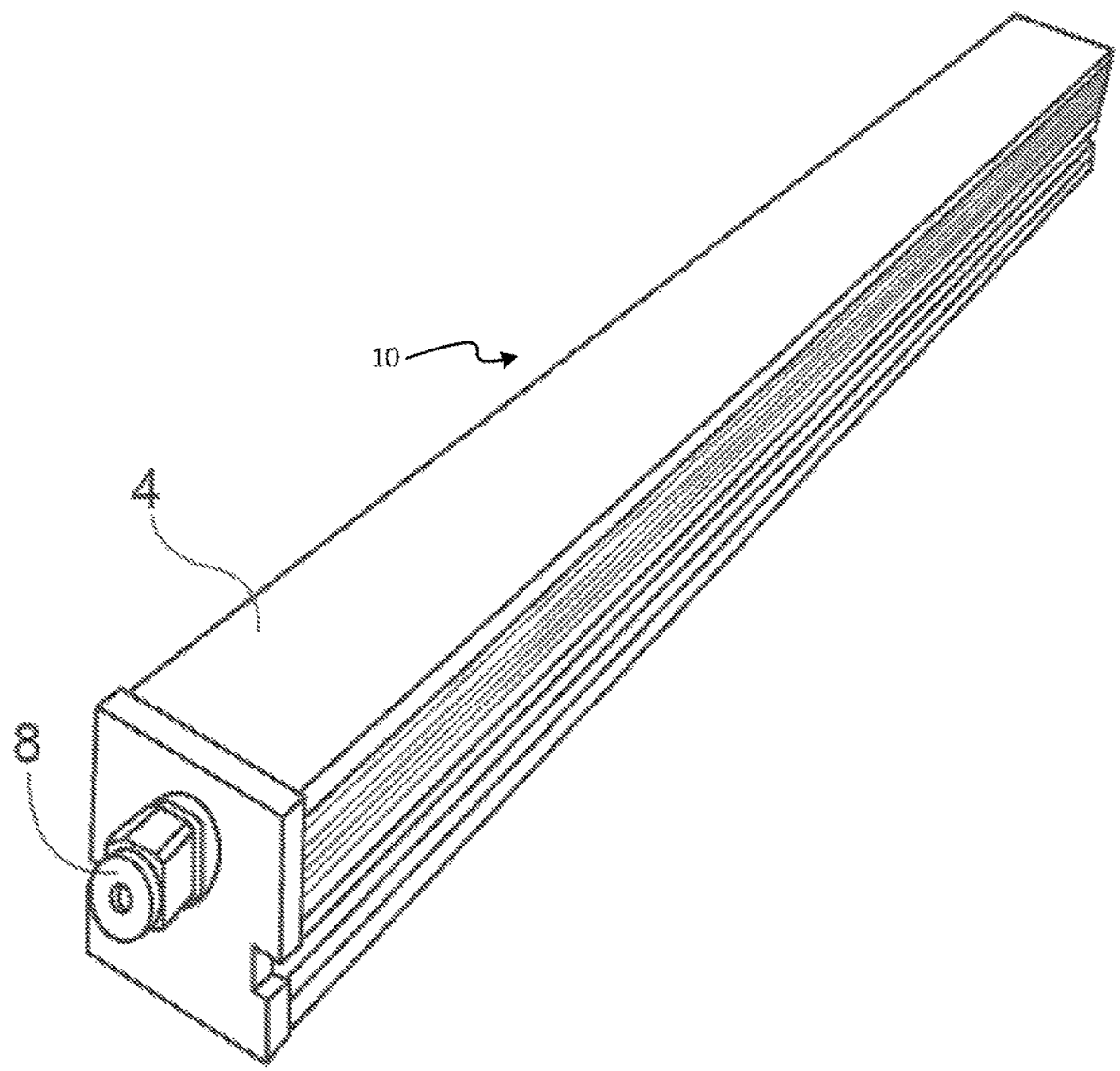
FIG. 2 is another perspective view of the horticultural light of FIG. 1.

FIG. 1 and FIG. 2 illustrate a horticultural light 10. The horticultural light 10 includes a linear aluminum housing fixture 4. In some embodiments, the housing fixture 4 is shaped differently. In the illustrated embodiment, the housing 4 includes accessories 8 (e.g., a male or female connector) to engage a similar housing fixture 4 so that multiple units may be coupled together for a larger illumination area. In some embodiments, the housing fixture 4 has an outer surface including an opening 11, through which an array 12 may protrude.

Each horticultural light 10 has an array 12 (See FIG. 1) of different LED color groups, a current control channel (e.g., the power converters 32 of FIG. 6) in electrical communication with at least one LED color group, a current measuring device 13 (See FIG. 4) to detect the current flow through each LED color group, a fixture control 20 (See FIG. 6) for modifying light wave intensity of the LED color groups (e.g., based on instructions from a user), and a programmable fixture firmware installed on each fixture control 20. A plurality of fixture controls 20 in a system of horticultural lights form a fixture mesh network (See FIG. 15). The user may specify and store a recipe that contains a specific combination of intensity levels for each LED color group in the fixture firmware. As set forth in greater detail below, a master fixture control receives user recipes and relays the information to other fixture controls via the fixture mesh network. In some embodiments, a communication bridge is coupled to the master fixture control to bridge between various networks which allows for more flexibility. Each horticultural light in a system may be assigned a control zone variable that identifies the location of the horticultural light in the instance that the user assigns different sections of horticultural lights to operate at different recipes. The fixture firmware may store control zone variables, user recipes, and multiple factory preset modes of operation.

FIG. 3 includes specifications for the LED color groups according to one embodiment, including type, color, peak wavelength, number of LEDs, current, voltage, and power. The LED color groups may be red, blue, white, ultraviolet, infrared, or another suitable color band. The color of a LED depends on the peak wavelength specification of the LED. For example, a blue LED operates at a peak wavelength between 450 to 500 nm while a red LED operates at peak wavelength between 610 to 760 nm. The amount of power supplied to a LED determines the light intensity of the produced colored light. Highly powered 5000K white LEDs may be used individually in "inspection mode" or in combination with LEDs operating at specific wavelengths in "growth mode."

Despite the limited spectrum, the use of multiple color groups of LEDs in a horticultural light system may be preferable to a system of traditional gas discharge bulbs, such as high intensity discharge (HID) bulbs or plasma bulbs, since LEDs are directly controlled by the amount of current received, providing finer control of the produced light spectrum of the system. Additionally, LEDs are more power efficient and have significantly longer lifespans than most traditional bulbs.

Figure 4:
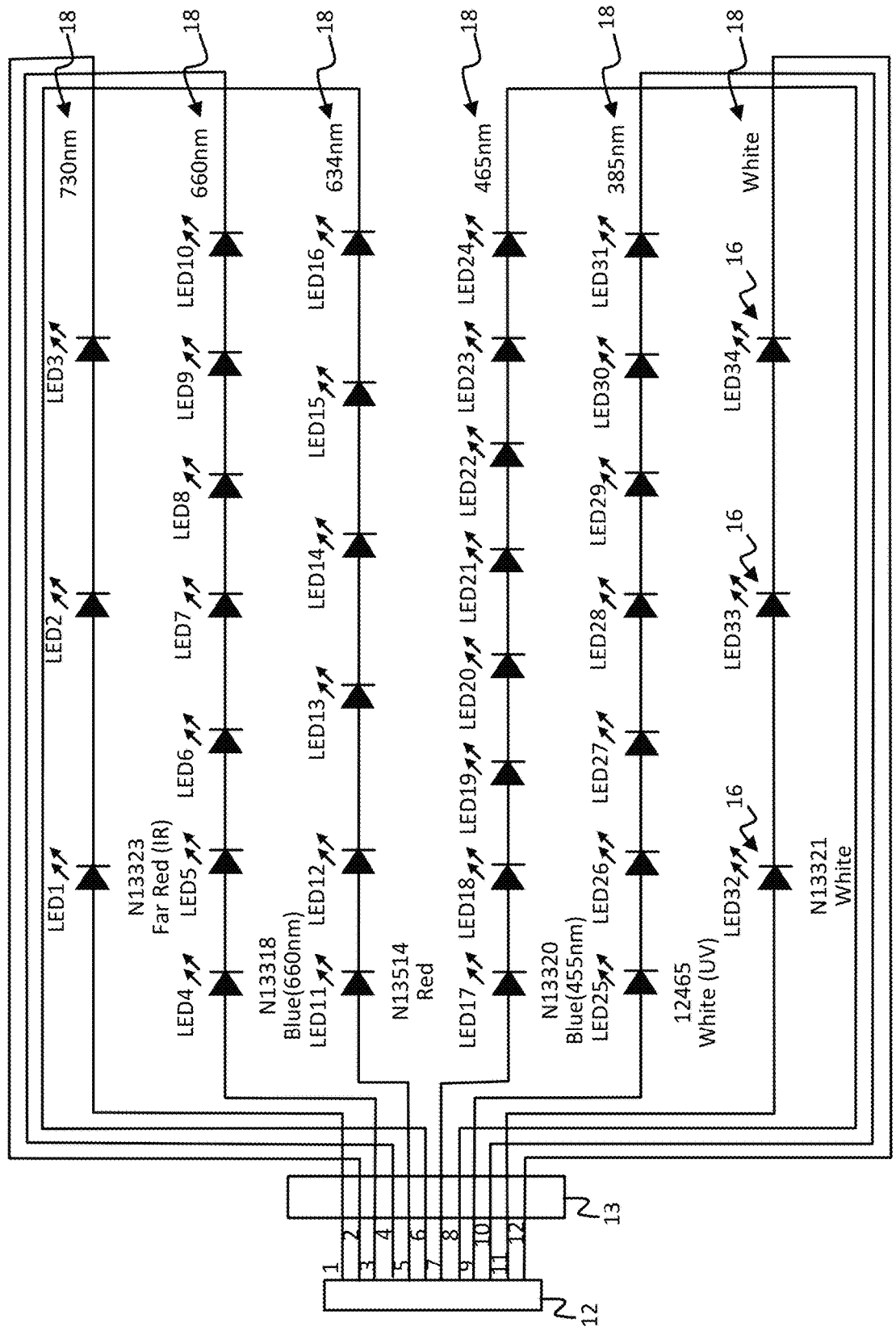
FIG. 4 is a circuit schematic of an LED board according to one embodiment.

FIG. 4 illustrates a circuit diagram for the LED board 12 according to one embodiment. As shown, groups of LEDs 16 operating at the same peak wavelength are wired in series in common LED color groups 18, and LEDs operating at different peak wavelengths are wired in parallel in separate LED color groups 18. Since current is the same for elements wired in series, this wiring configuration allows for "dimming" or "brightening" of each LED color group 18 independently of the other LED color groups 18. A current measuring device 13 detects current flow through each LED color group 18. The current measuring device detects a fault in a single LED driver or an LED color group 18, and instances in which a single LED color group 18 receives zero current may be reported or transmitted to the fixture mesh network. Such fault detection provides improved detection of failures especially failures that may not be visually apparent, such as in the case of an infrared LED failure. In some embodiments, the horticultural light has two LED boards 12.

Figure 5:
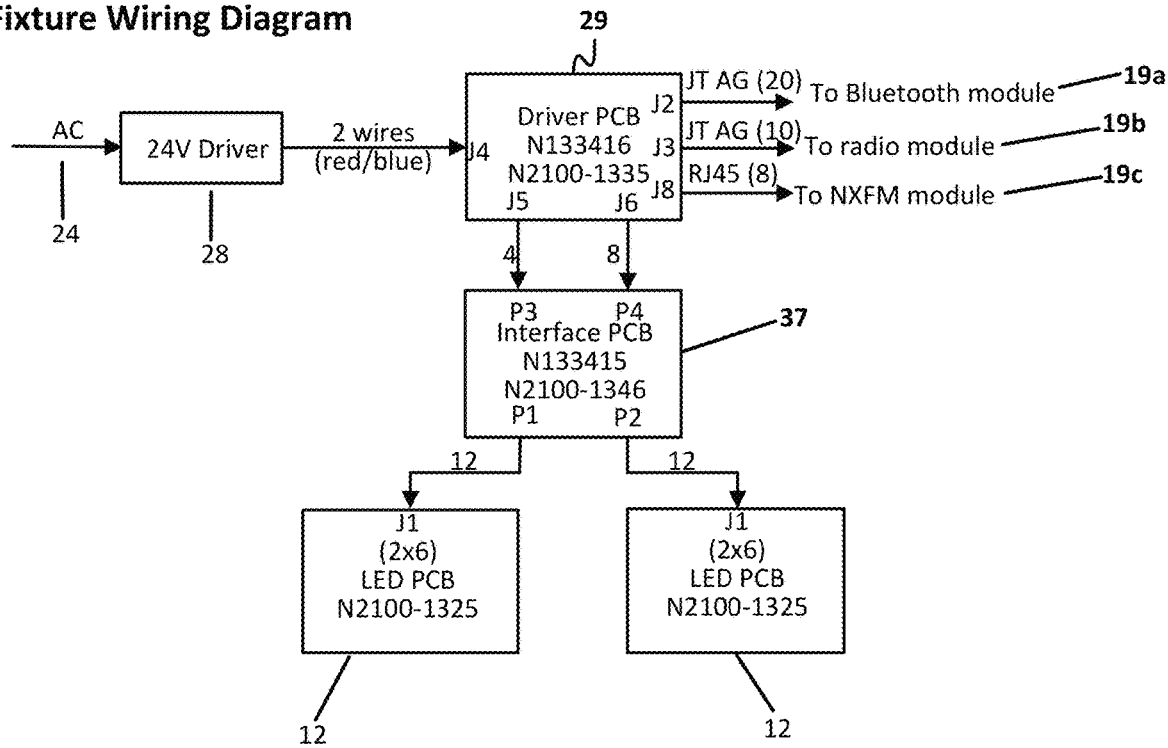
FIG. 5 is a wiring diagram of a fixture control according to one embodiment.

The fixture control 20 regulates current flow to each LED color group 18 within the horticultural light. FIG. 5 illustrates a wiring diagram for an example horticultural light 10. An AC input voltage 24 is transmitted to a constant voltage (CV) driver 28. The CV driver 28 provides power to a driver PCB 29. An interface 37 is coupled to the LED boards 12 and the driver PCB 29. The interface 37 receives recipes from the user. The interface 37 provides interfaces to other modules to allow the fixture to communicate with other fixtures and outside devices, such as smart phones or other computing devices. In the illustrated embodiment, the interface 37 includes a Bluetooth interface 19a, a radio frequency (RF) interface 19b, and a NXFM interface 19c. Alternative embodiments may provide other suitable interfaces.

Figure 6:
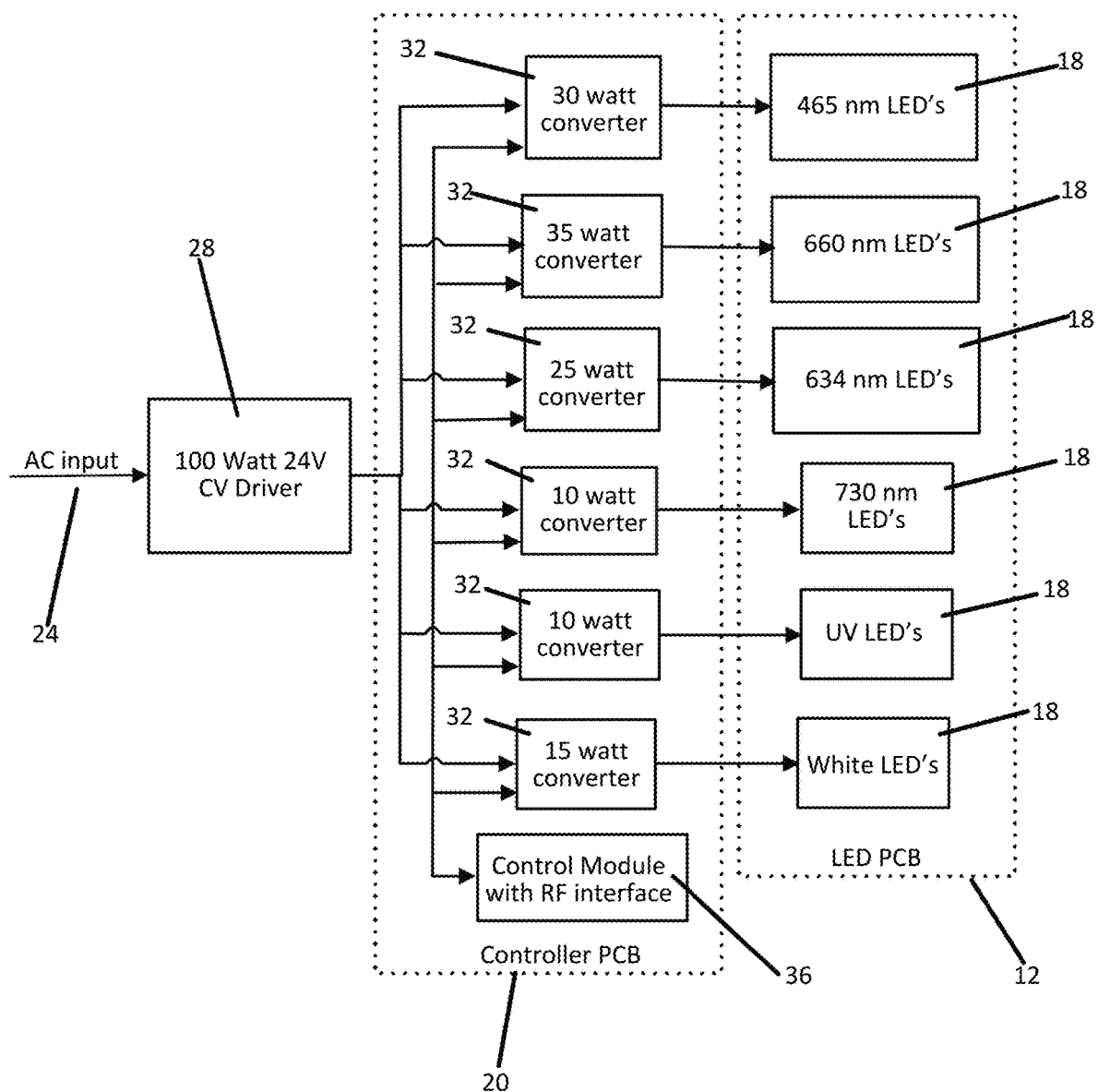
FIG. 6 is an electrical block diagram of a fixture control according to one embodiment.

FIG. 6 is a block diagram for an example horticultural light 10. In the illustrated embodiment, the CV driver 28 powers a fixture control 20. The fixture control 20 includes power converters 32 and a control module 36 with an interface 37 (See FIG. 5). The interface 37 receives recipes from the user, and the control module 20 transmits a signal to each power converter 32 to supply a corresponding power and current to each LED color group 18. The user has the option to leave certain LED color groups 18 disabled to achieve a more flexible range of light mix outputs.

Figures 7, 8, 9:
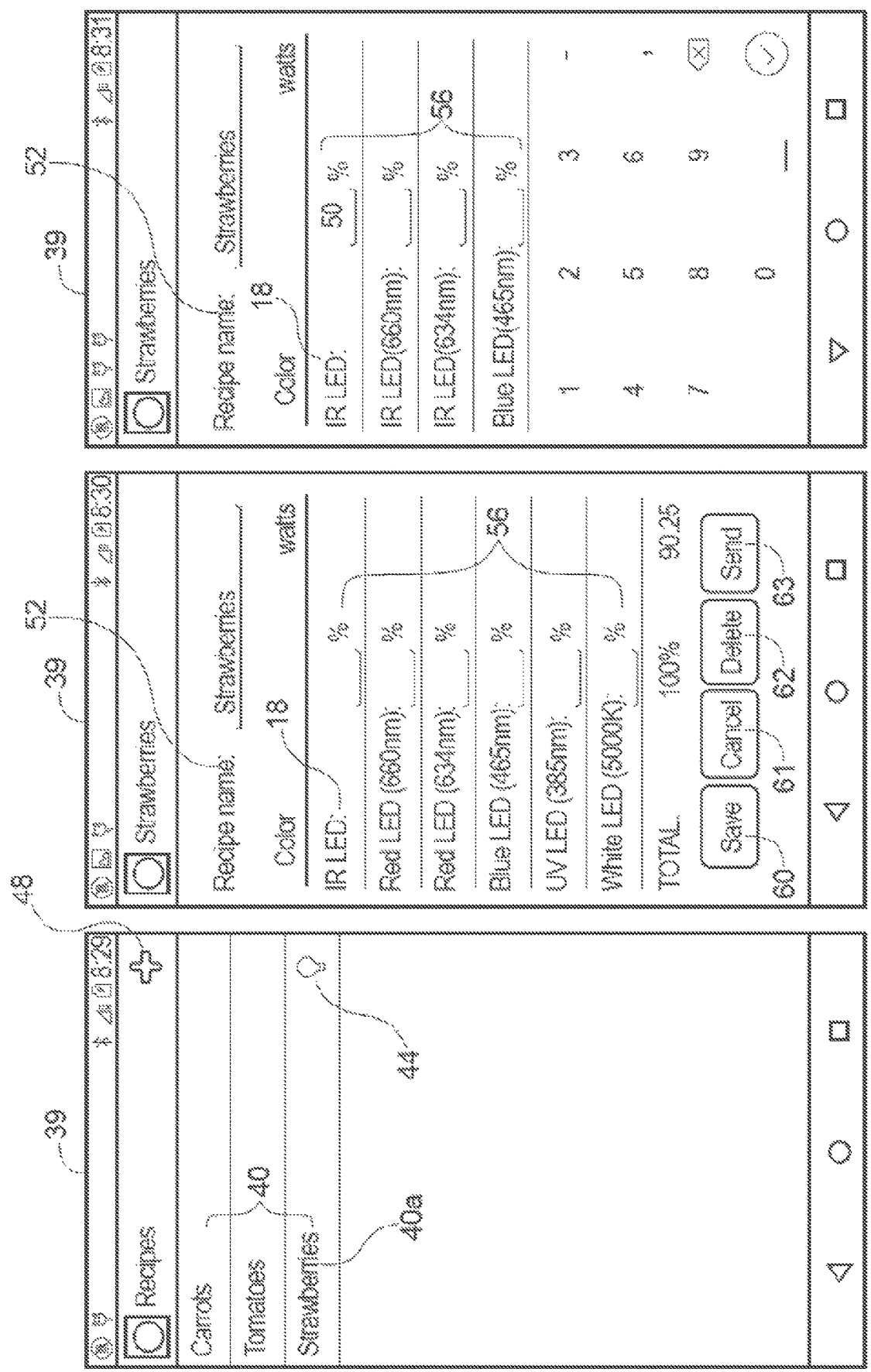
FIG. 7 is a graphical user interface for a recipe application display according to one embodiment.
FIG. 8 is another graphical user interface for a recipe application display according to one embodiment.
FIG. 9 is another graphical user interface for a recipe application display according to one embodiment.

FIGS. 7-9 illustrate screenshots of a recipe application 39 for generating recipes, according to one embodiment. As shown in FIG. 7, a welcome page of the application may include a list 40 of user stored recipes 40a. A light-bulb icon 44 may be displayed next to the recipe 40a that is currently applied to the horticultural light(s). A plus sign 48 (e.g., positioned in the upper right hand corner) may allow the user to add a new recipe 40a to the list 40. Selecting a recipe 40a may direct the user to a second page (FIG. 8) to edit the recipe 40a. The user may be prompted to enter a "Recipe name" 52 (e.g., in ASCII characters including upper case, lower case, blank, and underline characters). As shown in FIG. 9, the user may enter in a dim level 56 in percentages ranging from 30% to 100% to set the light intensity of each LED color group 18. After the desired adjustments have been made, the user may choose to "Save" 60, "Cancel" 61, "Delete" 62, or "Send" 63 the recipe (see FIG. 8). Saving may add the recipe 40a to the list 40 of stored user recipes displayed in FIG. 7. Canceling may erase user input information and return to the welcome page. Deleting may remove a previously stored recipe 40a from the list 40. Sending may deliver the user recipe 40a to another user.

Referring now to FIGS. 10-14, in some embodiments, when the recipe application 39 is launched, the application follows a sequence of events to configure a platform and handle new "events" or user recipes 40a. The application may be executed on a smart phone, tablet computer, or other computing device in communication with the lighting fixture 10.

Figure 10:
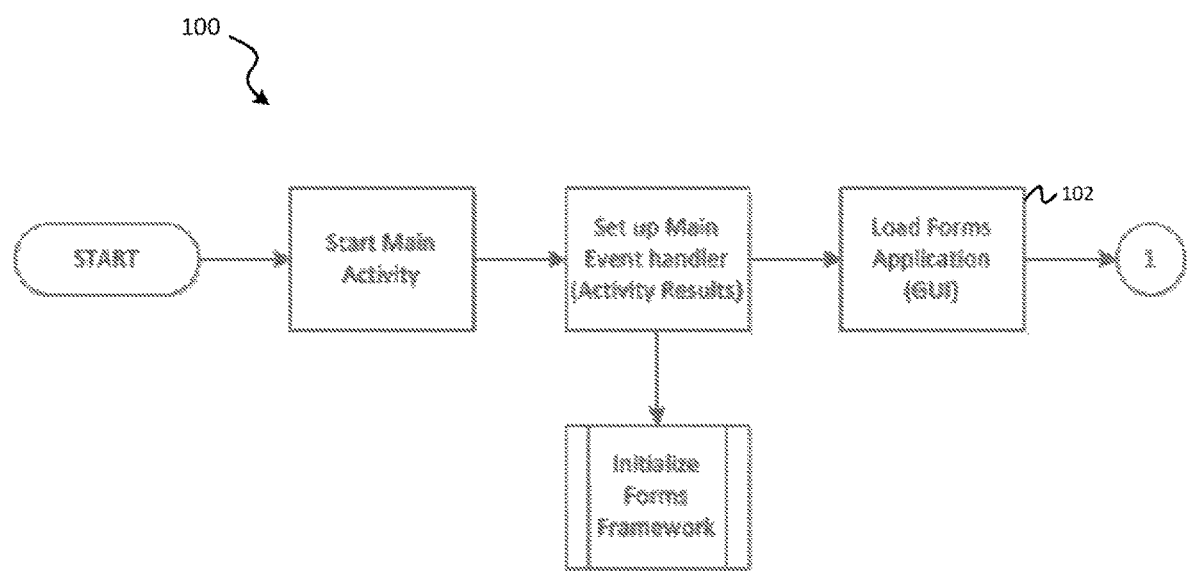
FIG. 10 is a flow diagram of a method for generating a recipe application startup platform.
Figure 11:
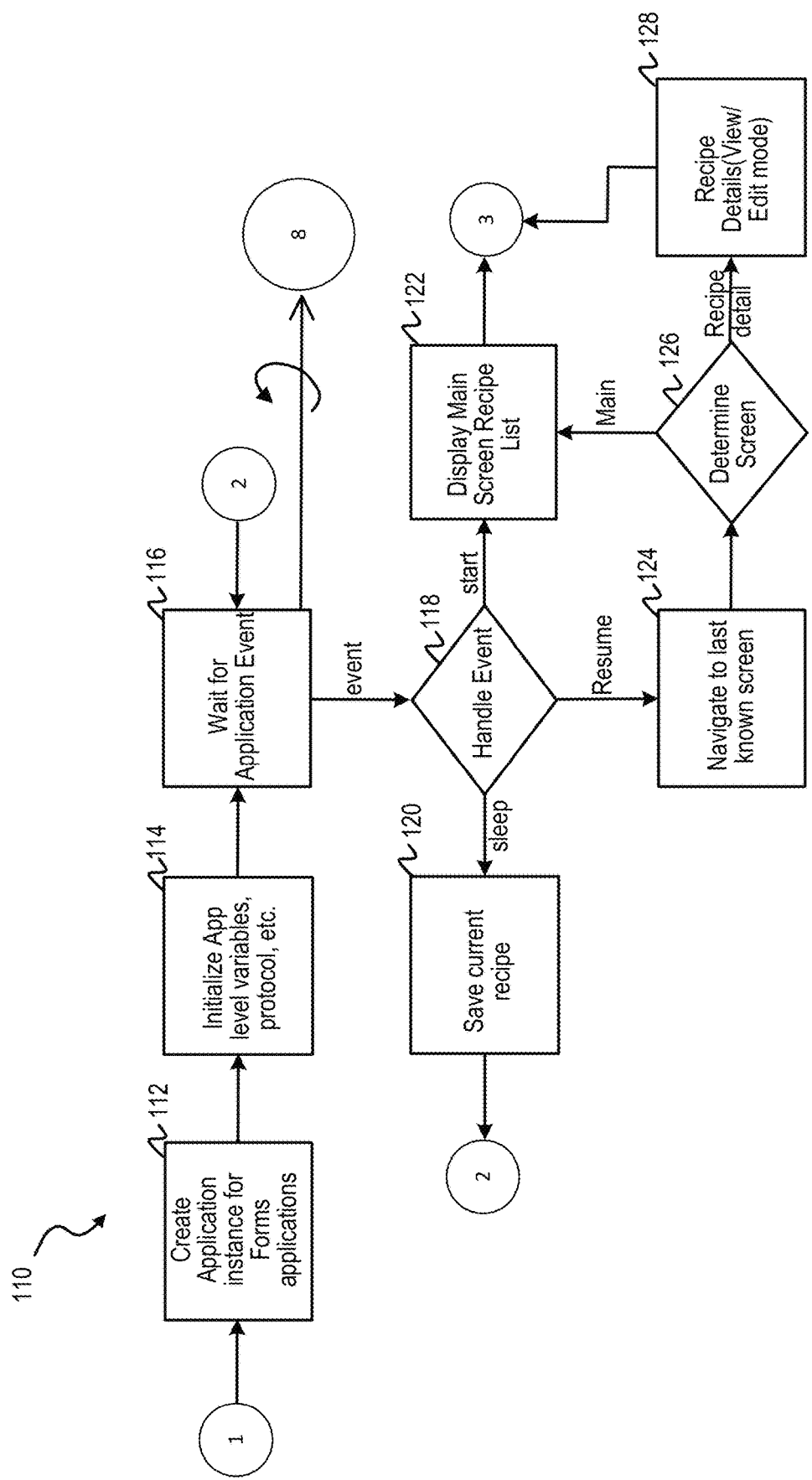
FIG. 11 is a flow diagram of a method for launching a recipe application.

FIG. 10 illustrates a flowchart of an example method 100 for a startup platform of one embodiment for loading the recipe application 39. Upon startup, the application loads the forms for a graphical user interface (at block 102). FIG. 11 illustrates a flowchart of an example method 110 for saving received recipes 40a, according to one embodiment. At blocks 112 and 114, the application instance is launched and the variables are initialized. At block 116, the application waits for an event, for example, for the user to select a command via the graphical user interface. At block 118, events are handled based on the nature of the events. For example, when no event is received within a determined time, the application sleeps and automatically saves the current recipe (at block 120). In another example, the application starts up by displaying a main screen (at block 122). In another example, on a wake event, the application resumes from where it was left off by navigating to the last known screen (at block 124) by determining the screen (at block 126). The screen may be the main screen (block 122) or the recipe detail screen (See FIGS. 8 and 9), at block 128.

Figure 12:
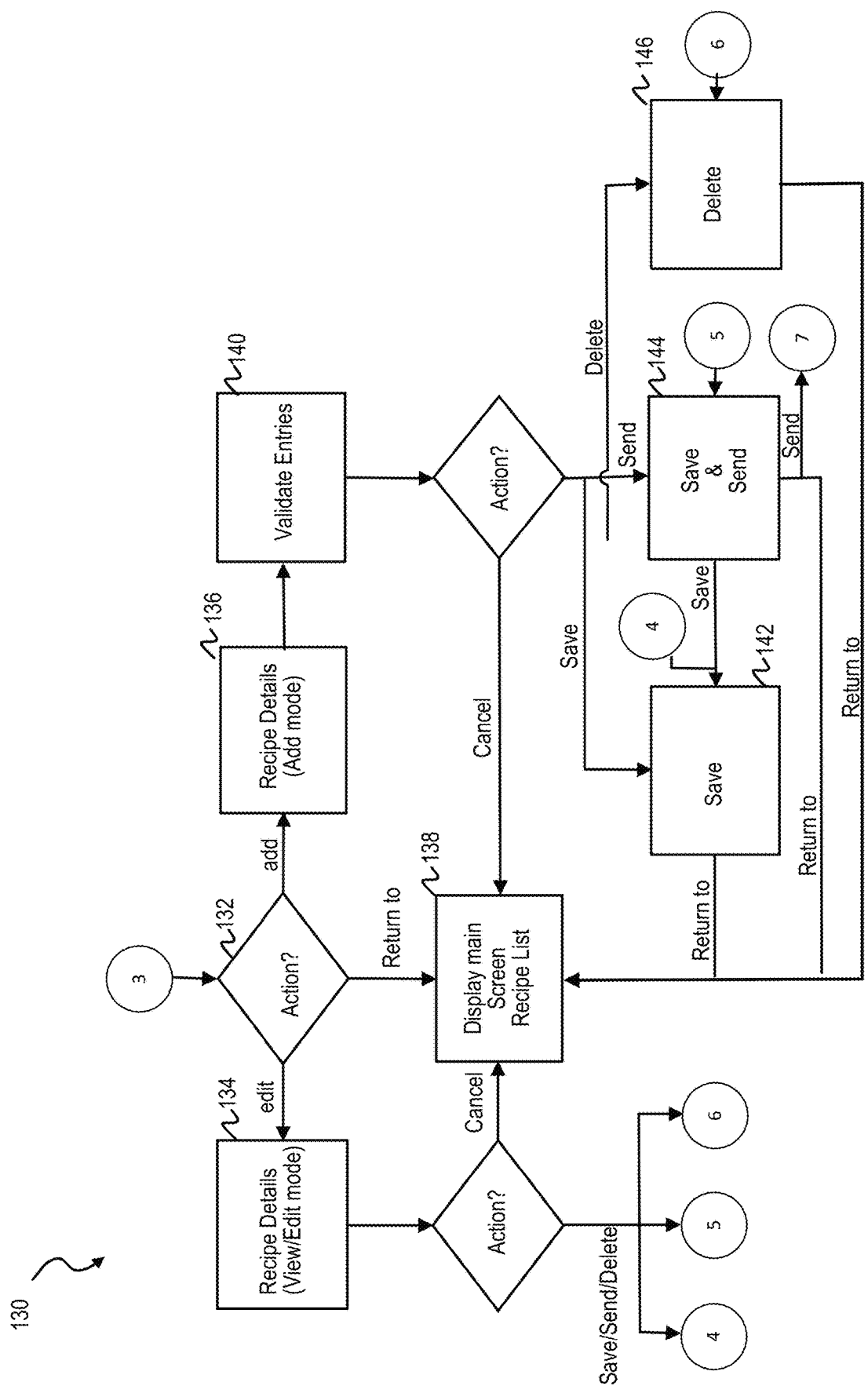
FIG. 12 is a flow diagram of a method for adding, changing, or deleting a recipe in a recipe application.

FIG. 12 illustrates a flowchart of a method 130 for adding, changing, or deleting a recipe 40a, according to one embodiment. At block 132, a user action is received and the application enters an edit mode (at block 134), an add mode (at block 136), or it returns to displaying the main screen (See FIG. 7) including a recipe list (at block 138). In the add mode, entries are validated (at block 140) for example, based on the configuration of the lighting fixture 10, and may be saved (at block 142), sent (at block 144), or deleted (at block 146).

Figure 13:
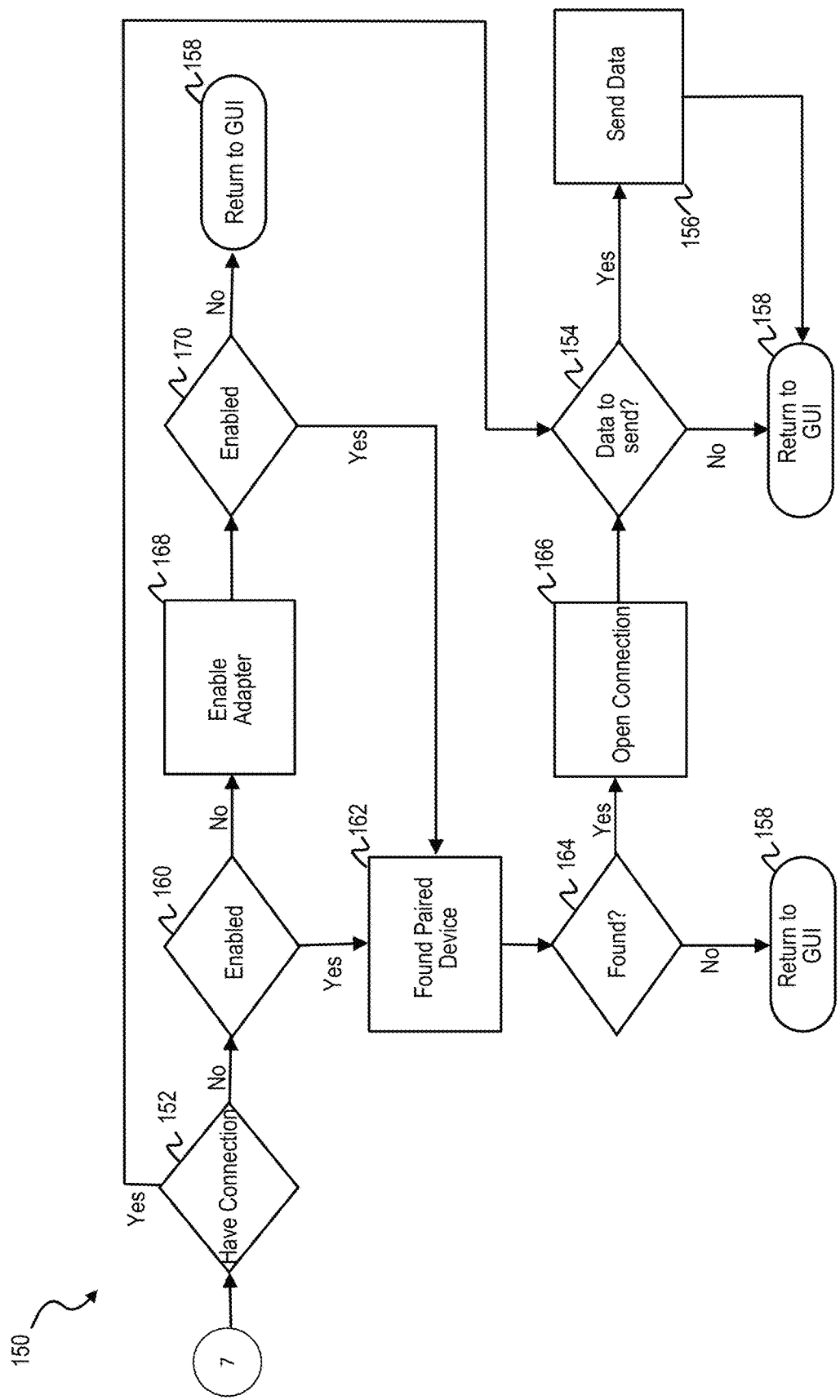
FIG. 13 is a flow diagram of a method for Bluetooth initialization and data transmission in the recipe application.

FIG. 13 illustrates a flowchart for a method 150 for enabling Bluetooth communication and transmitting information from the recipe application 39 to a paired device. In the embodiment illustrated, the paired device is the master fixture control 20. At block 152, the application determines whether a connection exists. When a connection exists, the application determines whether there is data to send, at block 154. When there is data to send, it is sent, at block 156, and the application returns to the graphical user interface, at block 158. When there is no data to send, the application returns to the graphical user interface, at block 158. When a connection does not exist, the application determines whether the Bluetooth adapter is enabled, at block 160. When the adapter is enabled, the application looks for a paired device, at block 162. When a paired device is not found, at block 164, the application returns to the graphical user interface, at block 158. When a paired device is found, at block 164, the application opens a connection, at block 166, and determines whether there is data to send, at block 154. When the adapter is not enabled, at block 160, the application issue a request to enable the adapter, at block 168. When the request successfully enables the adapter, at block 170, the application looks for a paired device, at block 162. When the request does not successfully enable the adapter, at block 170, the application returns to the graphical user interface, at block 158.

Figure 14:
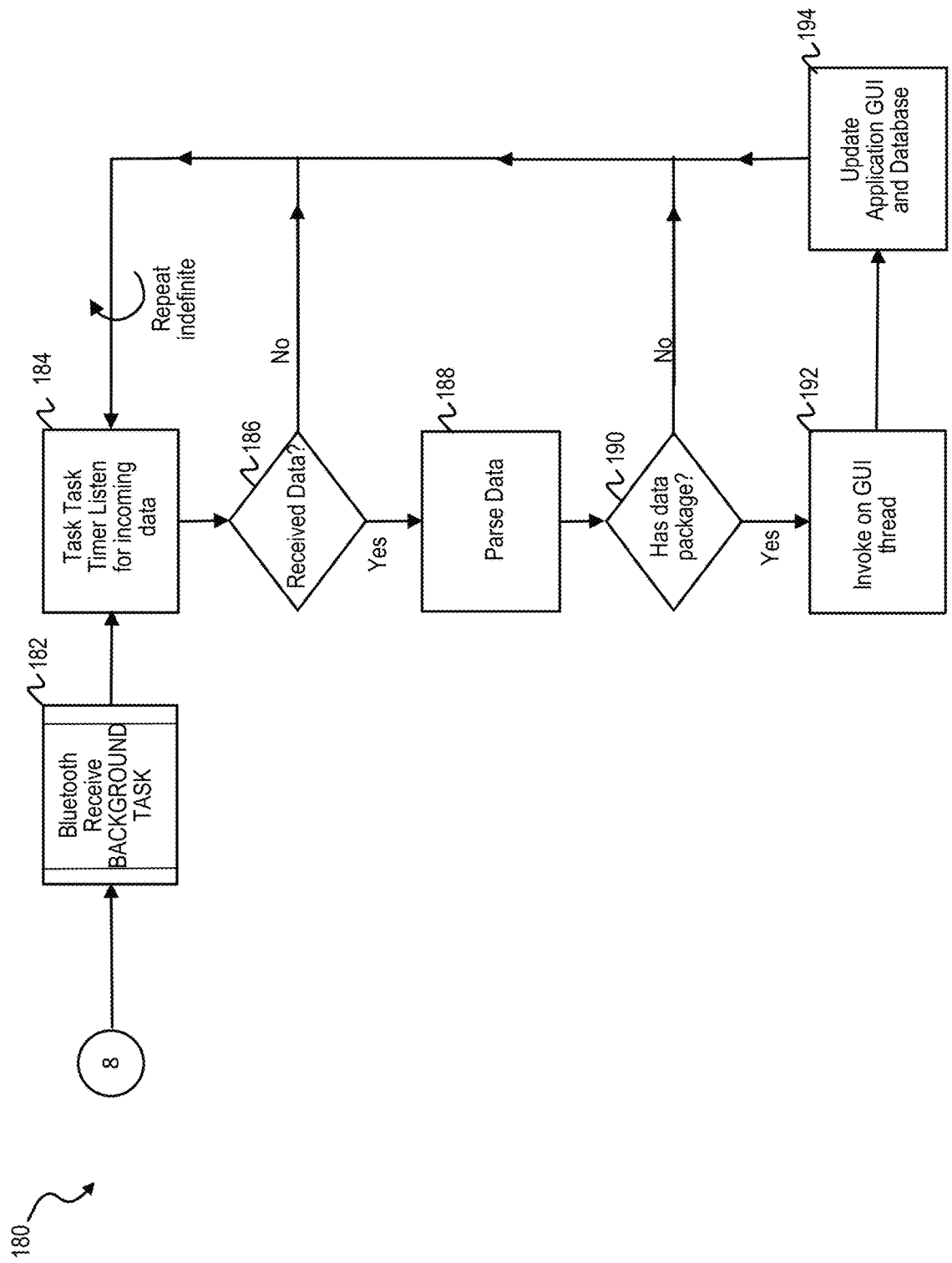
FIG. 14 is a flow diagram of a method for managing Bluetooth communication in a recipe application.

FIG. 14 illustrates a flowchart of a method 180 for processing and updating transmitted information in the recipe application 39. At block 182, Bluetooth is running and receiving data as a background process. At block 184, the application listens for incoming data. When data is not received, at block 186, the application continues to listen, at block 184. When data is received, at block 186, the application parses the data, at block 188. When the data includes a data package, at block 190, the application invokes the data package, at block 192, and updates the GUI and database based on the data package, at block 194. When the data does not include a data package, the application continues to listen for data at block 184.

Figure 15:
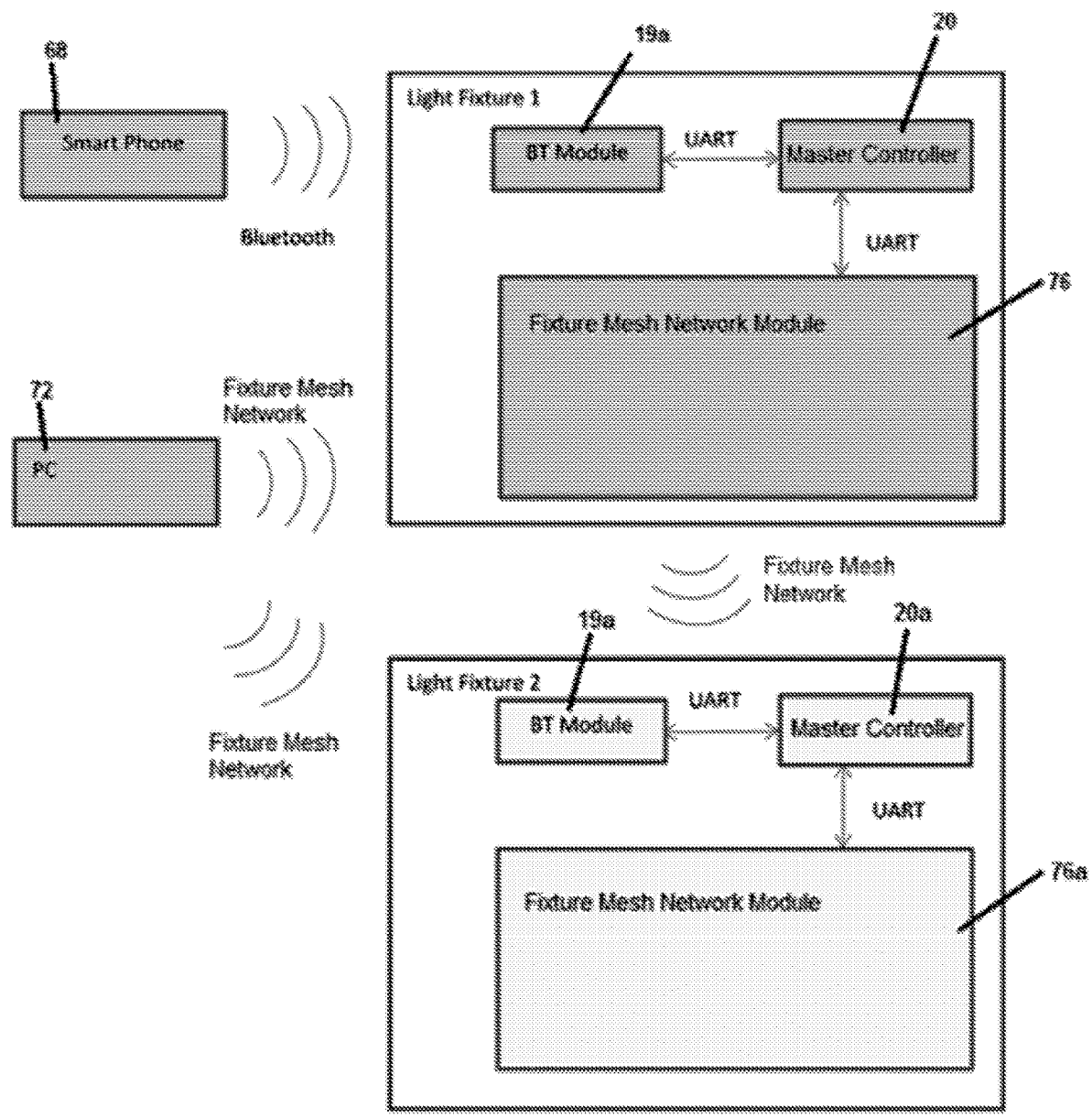
FIG. 15 is a communication block diagram.

The master fixture control 20 may receive user recipes 40a via a hand-held device (for example, a smart phone), a computer, or another computing device. For example, as illustrated in FIG. 15, a smart phone 68 operating the recipe application 39 transmits information via Bluetooth to the master fixture control 20. In some embodiments, upon being received by the Bluetooth module 19a, the signal is transmitted to the master fixture control 20 via a universal asynchronous receiver/transmitter (UART). The fixture control module 20 uses the recipe 40a to regulate current flow to each LED color group 18 to produce a desired light mix output, as specified in the recipe 40a.

In some embodiments, only the fixture control 20 to be updated will receive the user recipe 40a and will make adjustments to the light mix output. In such embodiments, the user recipe 40a is not transmitted to the other fixture control(s) 20 in communication with the fixture mesh network 76.

In some embodiments, using the fixture mesh network interface, the master fixture control 20 transmits the user recipes 40a to other fixture control(s) 20 in the system of horticultural lights in communication with the fixture mesh network. Accordingly, a user may control multiple horticultural lights in different zones to operate under different recipes as opposed to all horticultural lights outputting the same light mix.

A similar sequence of steps is followed for recipe instructions transmitted via a computer or other computing device. For example, a personal computer (PC) 72 including a fixture control application, for example, the application 39, may send a signal to the fixture mesh network 76 via a USB bridge node (not shown). The USB Bridge includes a USB port and an antenna that transmits information from the PC 72 to the fixture mesh network module 76. When the fixture control 20 connects to the fixture mesh network module 76. Once connected, the fixture control 20 adjusts the light mix output and updates the recipe 40a in the fixture firmware based on the user input, for example, located within a zone specified by the use. Firmware may store one or more zone control variables, one or more user input recipes, and multiple preset modes of operation. In some embodiments, the recipe 40a is stored in nonvolatile memory, thus retaining stored recipe information in the event of a power outage. As discussed above, in other embodiments, a different type of networks 19(a-c) could be used to transmit information from the PC 72 to the fixture control(s) 20.

Figure 16:
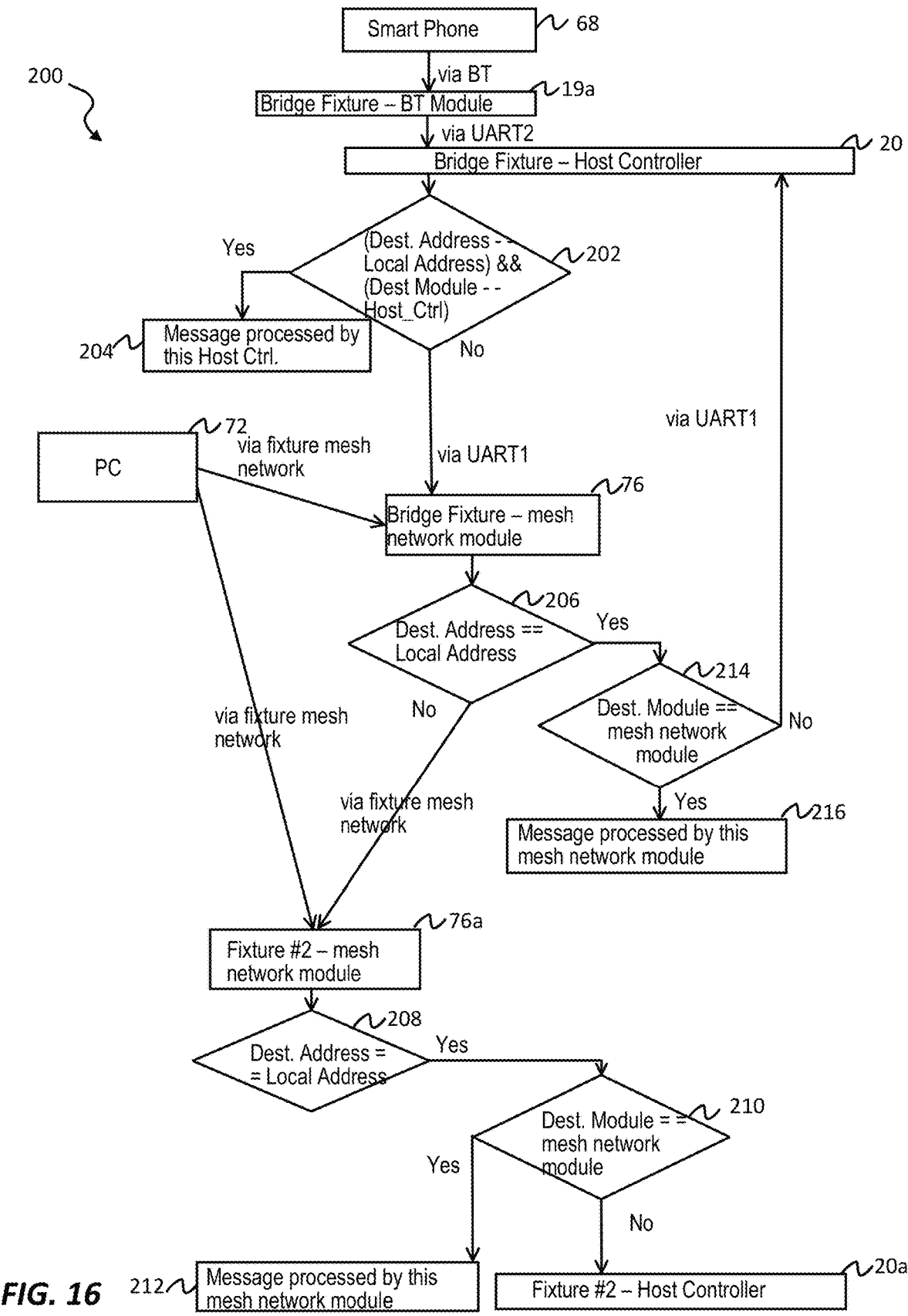
FIG. 16 is a flow diagram of a method for controlling a fixture mesh network using a user operated device.

Horticultural lights may be controlled individually, a group of horticultural lights may be controlled according to zone specifications, or all horticultural lights may be controlled in unison. If a user chooses to control the system of horticultural lights according to zones, the system performs a test to confirm whether a located fixture control 20 is the fixture control 20 specified by the user. FIG. 16 illustrates a flowchart of a commissioning method 200 for determining which fixture control(s) 20 in a fixture mesh network 76 to update with a recipe 40a. In some embodiments, commissioning may depend on the type of device that transmits recipe information to the fixture control(s).

The smart phone 68 or the computer 72 transmit recipes to the mesh network modules 76, 76a, as described above. At block 202, when the message received is addressed to the local host and the destination module is that lighting fixture, the message is processed by that host, at block 204. Otherwise, the mesh network module 76 receives the message and determines whether it is addressed locally or remotely, at block 206. When the message is addressed remotely, it is sent to the mesh network module 76a, which determines, at block 208, whether the message is addressed to it. When the message is addressed to that lighting fixture and module, at block 210, the message is processed by the network module, at block 212. At block 206, when the message is addressed to that lighting fixture and module, at block 214, the message is processed by the network module, at block 216.

Although aspects have been described in detail with reference to certain preferred embodiments, variations and modifications exist within the scope and spirit of one or more independent aspects as described.

We claim:

1. A horticultural light fixture, comprising:
    a plurality of light emitting diode (LED) color groups, wherein the plurality of LED color groups include at least an infrared LED color group and an ultraviolet LED color group; and
    a fixture controller comprising
        a power input, for receiving power from a power source,
        an interface configured to receive a recipe from a user, the recipe specifying a desired light mixture to be output from the horticultural light fixture,
        a control module generating control signals, the control signals generated based on the recipe, and
        a plurality of power converters, each power converter receiving a control signal from the control module to cause the power converter to supply a predetermined output power and output current to a corresponding one of the LED color groups to cause the desired light mixture to be output from the plurality of LED color groups.

2. The horticultural light fixture of claim 1, wherein the fixture controller further comprises a memory for storing one or more recipes.

3. The horticultural light fixture of claim 1, wherein the power source is a constant voltage driver.

4. The horticultural light fixture of claim 1, wherein the plurality of LED color groups further include at least one white LED color group, at least one blue LED color group, and at least one red LED color group.

5. The horticultural light fixture of claim 1, wherein the at least one-infrared LED color group produces light output with a wavelength in the range of 700-800 nm and the at least one-ultraviolet LED color group produces light output with a wavelength in the range of 300-400 nm.

6. The horticultural light fixture of claim 4, wherein the at least one white LED color group produces light output with a color temperature of 5000 K, the at least one blue LED color group produces light output with a wavelength of 465 nm, and the at least one red LED color group produces light output with a wavelength of between 630 nm and 660 nm.

7. The horticultural light fixture of claim 1, wherein the horticultural light fixture is associated with a fixture identifier, allowing the horticultural light fixture to be identified in a network of horticultural light fixtures.

8. The horticultural light fixture of claim 1, wherein the interface is a radio-frequency interface and the recipe is received by radio-frequency transmission.

9. The horticultural light fixture of claim 1, further comprising:
    a current measuring device in electrical communication with at least one LED color group, the current measuring device detecting current flow to the LED color group.

10. A horticultural lighting system, comprising:
    a plurality of light fixtures, each light fixture identified by a fixture identifier and comprising a plurality of light emitting diode (LED) color groups, wherein the plurality of LED color groups include at least an infrared LED color group and an ultraviolet LED color group;
    a fixture controller mounted in each of the light fixtures, the fixture controller comprising:
        a power input, receiving power from a power source;
        an interface configured to receive a recipe, the recipe specifying a desired light mixture to be output from the light fixture;
        a control module generating control signals, the control signals generated based on the recipe; and
        a plurality of power converters, each power converter receiving a control signal from the control module to cause the power converter to supply a predetermined output power and output current to a corresponding one of the LED color groups to cause the desired light mixture to be output from the light fixture; and
    a lighting system controller, in wireless communication with each of the plurality of light fixtures, the lighting system controller receiving at least a first recipe from a user and transmitting the first recipe to one or more light fixtures of the plurality of light fixtures to cause a desired light mixture to be output from the one or more light fixtures.

11. The horticultural lighting system of claim 10, wherein the fixture controller further comprises a memory for storing one or more recipes.

12. The horticultural lighting system of claim 10, wherein the power source is a constant voltage driver.

13. The horticultural lighting system of claim 10, wherein the plurality of LED color groups further include at least one white LED color group, at least one blue LED color group, and at least one red LED color group.

14. The horticultural lighting system of claim 10, wherein the infrared LED color group produces light output with a wavelength in the range of 700-800 nm and the ultraviolet LED color group produces light output with a wavelength in the range of 300-400 nm.

15. The horticultural lighting system of claim 13, wherein the at least one white LED color group produces light output with a color temperature of 5000 K, the at least one blue LED color group produces light output with a wavelength of 465 nm, and the at least one red LED color group produces light output with a wavelength of between 630 nm and 660 nm.

16. The horticultural lighting system of claim 10, wherein each light fixture is associated with a fixture identifier, allowing each light fixture to be identified in a network of horticultural light fixtures.

17. The horticultural lighting system of claim 10, wherein the interface is a radio-frequency interface and the recipe is received by radio-frequency transmission.

18. The horticultural lighting system of claim 10, wherein each light fixture further includes a current measuring device in electrical communication with at least one LED color group, the current measuring device detecting current flow to the LED color group.

19. The horticultural light fixture of claim 1, wherein the fixture controller of the horticultural light fixture and at least one other fixture controller of at least one other light fixture form a fixture mesh network for establishing direct communication between the horticultural light fixture and the at least one other light fixture.

20. The horticultural lighting system of claim 10, wherein the fixture controllers of the plurality of light fixtures form a fixture mesh network for establishing direct communication between the plurality of light fixtures.

21. A non-transitory machine-readable storage medium that stores instructions which, when executed by a computer, causes the computer to control a light fixture, the instructions comprising:
receiving, via an interface, a recipe, the recipe specifying a desired light mixture to be emitted from the light fixture, wherein the light fixture comprises a plurality of light emitting diode (LED) color groups, the plurality of LED color groups including at least an infrared LED color group and an ultraviolet LED color group;
generating control signals based on the recipe, the control signals configured to cause one or more power converters to supply a predetermined output power and output current to a corresponding one of the LED color groups to cause the desired light mixture to be emitted from the light fixture;
receiving, via a master fixture controller, a user-specified recipe from a user; and
transmitting, via the master fixture controller, the user-specified recipe to one or more light fixtures of a plurality of light fixtures to cause the desired light mixture to be output from the one or more light fixtures, wherein the master fixture controller is in wireless communication with the plurality of light fixtures.

22. The non-transitory machine-readable storage medium of claim 21, wherein the instructions further comprise storing one or more recipes in a memory, wherein the one or more recipes comprises the recipe received via the interface and/or the user-specified recipe received via the master fixture controller.

23. The non-transitory machine-readable storage medium of claim 21, wherein the plurality of LED color groups further include at least one white LED color group, at least one blue LED color group, and at least one red LED color group.

24. The non-transitory machine-readable storage medium of claim 21, wherein the infrared LED color group produces light output with a wavelength in the range of 700-800 nm and the ultraviolet LED color group produces light output with a wavelength in the range of 300-400 nm.

25. The non-transitory machine-readable storage medium of claim 23, wherein the at least one white LED color group produces light output with a color temperature of 5000 K, the at least one blue LED color group produces light output with a wavelength of 465 nm, and the at least one red LED color group produces light output with a wavelength of between 630 nm and 660 nm.

26. The non-transitory machine-readable storage medium of claim 21, wherein each of the plurality of light fixtures is associated with a fixture identifier, and wherein the instructions further comprise identifying each light fixture based on the fixture identifier within a network of the plurality of light fixtures.

27. The non-transitory machine-readable storage medium of claim 21, wherein the interface is a radio-frequency interface, and wherein the instructions comprise receiving the recipe by radio-frequency transmission.

28. The non-transitory machine-readable storage medium of claim 21, wherein the light fixture further includes a current measuring device in electrical communication with at least one of the plurality of LED color groups, the current measuring device detecting current flow to the at least one of the plurality of LED color groups.

* * * * *